(12) United States Patent
Colombi et al.

(10) Patent No.: US 11,949,280 B2
(45) Date of Patent: Apr. 2, 2024

(54) METHOD FOR CONTROLLING AN UNINTERRUPTABLE POWER SUPPLY

(71) Applicant: ABB Schweiz AG, Baden (CH)

(72) Inventors: Silvio Colombi, Losone (CH); Andrea Mannuccini, Riazzino (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/480,450

(22) Filed: Sep. 21, 2021

(65) Prior Publication Data

US 2022/0094197 A1   Mar. 24, 2022

(30) Foreign Application Priority Data

Sep. 21, 2020 (EP) .................................... 20197274

(51) Int. Cl.
*H02J 9/06* (2006.01)
*H02H 7/122* (2006.01)
*H02J 3/36* (2006.01)
*H02J 3/46* (2006.01)
*H02M 7/08* (2006.01)
*H02M 7/493* (2007.01)

(52) U.S. Cl.
CPC .......... *H02J 9/061* (2013.01); *H02H 7/1227* (2013.01); *H02J 3/36* (2013.01); *H02J 3/46* (2013.01); *H02M 7/08* (2013.01); *H02M 7/493* (2013.01); *H02J 2310/10* (2020.01)

(58) Field of Classification Search
CPC ...... H02J 9/061; H02J 3/36; H02J 3/46; H02J 2310/10; H02H 7/1227; H02M 7/08; H02M 7/493
See application file for complete search history.

(56) References Cited

U.S. PATENT DOCUMENTS

| 9,735,616 B2 | 8/2017 | Colombi et al. |
| 2005/0201127 A1 | 9/2005 | Tracy et al. |
| 2015/0070026 A1* | 3/2015 | Vincent .................... H02H 3/10 324/522 |
| 2015/0263568 A1* | 9/2015 | Colombi ................. H02J 9/061 307/64 |

FOREIGN PATENT DOCUMENTS

EP          2919350 A1     9/2015

* cited by examiner

*Primary Examiner* — Elim Ortiz
(74) *Attorney, Agent, or Firm* — Armstrong Teasdale LLP (57) ABSTRACT

The disclosure relates to a method for controlling an uninterruptable power supply and a respective computer program. The uninterruptable power supply comprises a grid connection, a grid switch connected to the grid connection, a rectifier and an inverter interconnected via a DC link, an energy storage connected to the DC link, a load connection, to which the inverter is connected, and a bypass switch, which is connected in parallel to the rectifier, the DC link and the inverter between the grid switch and the load connection, wherein the grid switch is a mechanical switch and the bypass switch is a semiconductor switch.

13 Claims, 3 Drawing Sheets

METHOD FOR CONTROLLING AN UNINTERRUPTABLE POWER SUPPLY

CROSS REFERENCE TO RELATED APPLICATIONS

This patent application claims the benefit and priority of European Patent Application No. 20197274.2 filed on Sep. 21, 2020, the disclosure of which is incorporated by reference herein in its entirety as part of the present application.

BACKGROUND

The disclosure relates to a method for controlling an uninterruptable power supply and a respective computer program. In particular, the disclosure relates to a control device for controlling an uninterruptable power supply and an uninterruptable power supply with such a control device.

If a grid connected to an uninterruptable power supply suffers an electric fault, an energy storage and an inverter of the uninterruptable power supply are designed to supply a nominal load for a predetermined period of time. If a load connected to the uninterruptable power supply suffers an electric fault, the energy storage and the inverter may have to supply an overload bigger than the nominal load for the predetermined period of time. Electric and electronic components of the uninterruptable power supply have to be sized bigger than required for the nominal load, to withstand a thermal stress resulting from the overload.

BRIEF DESCRIPTION

Embodiments of the present disclosure provide an improved method for controlling an uninterruptable power supply and further provide an economic and reliable uninterruptable power supply.

These embodiments are achieved by the subject-matter of the independent claims. Further exemplary embodiments are evident from the dependent claims and the following description.

The disclosure relates to a method for controlling an uninterruptable power supply. For example, the uninterruptable power supply may be used to provide uninterruptable electric power to critical infrastructure, such as a communication nexus or a railway control center. The uninterruptable power supply may be able to provide electrical power up to a multi-megawatt-range.

According to an embodiment of the disclosure, the uninterruptable power supply includes a grid connection, a grid switch connected to the grid connection, a rectifier and an inverter interconnected via a DC link, an energy storage connected to the DC link, a load connection, to which the inverter is connected, and a bypass switch, which is connected in parallel to the rectifier, DC link and inverter between the grid switch and the load connection.

The grid connection may be an interface to connect the uninterruptable power supply to an electric power grid. The grid connection may be a multi-phase connection for a multi-phase alternating current (AC). The grid switch may be an engaging and disengaging electrical switch. The grid switch may be a multi-phase switch, having a separate switching element for every electric line connected to the grid. The rectifier may be configured to convert the alternating current (AC) to a direct current (DC). The rectifier may be an active component with actively controlled electronic components. An electric input of the rectifier for the alternating current (AC) may be multi-phase. An electric output of the rectifier for the direct current (DC) may be a single DC voltage. Then the DC link may be a single voltage link for the direct current (DC). The electric output of the rectifier for the direct current (DC) may also have multiple DC voltage levels. Consequently, the DC link may also have multiple DC voltage levels. The DC link may also include one or more capacitors. An electric input of the inverter for the direct current (DC) may be the single dc voltage or have the multiple DC voltage levels. The inverter may be configured to convert the direct current (DC) or the multiple DC voltage levels to an alternating current (AC). The alternating current (AC) may have the same voltage as the alternating current (AC) of the grid. The inverter may also be an active component with actively controlled electronic components. An electric output of the inverter for the alternating current (AC) may be multi-phase. The energy storage may include at least a battery. The energy storage may also include a capacitor. The load connection may be an interface to connect the uninterruptable power supply to an electric load. The load connection may be multi-phase. The bypass switch may be an engaging and disengaging electrical switch. The bypass switch may be for alternating current (AC) and may be multi-phase.

In an embodiment the grid switch is a mechanical switch and the bypass switch is a semiconductor switch. A mechanical switch may have at least one movable switching element per phase. The mechanical switch may be mechanically actuated. For example, the mechanical switch may be spring-loaded. The mechanical switch may also be electrically actuated. For example, the mechanical switch may have an electromagnetic opener and/or an electromagnetic closer. The mechanical switch may be robust. The mechanical switch may take some time to be opened or closed. All phases of the mechanical switch may be opened or closed at the same time. The grid switch may have a control device to signal a state of the grid switch. For example, the control device may be an electric circuit, that closes when the switching elements of the grid switch reach an open position. A semiconductor switch may have electronically switchable electronic components. The semiconductor switch may have no movable parts. The semiconductor switch may be fast. The semiconductor switch may be opened or closed virtually instantaneous. The semiconductor switch may have at least one semiconductor switching element per phase.

According to an embodiment, in a normal operation mode the bypass switch is opened, the grid switch is closed, the uninterruptable power supply is connected to the grid via the grid connection and connected to the load via the load connection. In the normal operation mode, the rectifier operates in a rectifying mode, in which an AC current from the grid is converted to a DC current supplied to the DC link. In the normal operation mode, the inverter operates in an inverting mode to convert the DC current from the DC link into an AC current supplied to the load. In the normal operation mode, the energy storage may be charged and/or used to buffer variations in the load to provide additional energy in case of large overloads. For example, the rectifier may be sized for 120% of a nominal load. When an overload greater than 120% nominal load occurs, energy is taken from the battery to sustain the load.

According to an embodiment, upon receiving a fault signal, which signals an electrical fault concerning the load or the grid, the method includes sending a disconnect signal to the grid switch to open the grid switch and disconnect the uninterruptable power supply from the grid. A fault concerning the grid may be for example, an undervoltage in at least one phase, a power outage or a power surge. The fault may also be a frequency deviation. If the fault concerns the grid, the bypass may be not available. A fault concerning the load for example may be a short circuit. Since the bypass switch is a semiconductor switch and the grid switch is a mechanical switch, the bypass switch closes faster than the grid switch opens.

When the load is higher than a nominal load, the inverter outputs more than the nominal load. A temperature of the inverter may thus rise above a nominal temperature. Since the rectifier will support the inverter after the confirmation signal is received, an absolute temperature rise during the exclusive use of the inverter will be within specified limits.

According to an embodiment, upon receiving a confirmation signal from the grid switch, which confirms disconnection from the grid, the method includes sending a closing signal to the bypass switch and sending a mode change signal to the rectifier to operate the rectifier in an inverting mode, in which a DC current from the energy storage is converted into an AC current, such that the load is supplied by the inverter and the rectifier. The rectifier may be operated in reverse, since it includes actively controlled electronic components. The AC current generated by the rectifier flows over the closed bypass switch to the load connection. The closing signal for the bypass switch may be sent staggered to the opening signal for the grid switch by a closing duration of the grid switch.

According to an embodiment, upon receiving the fault signal, the method includes sending a termination signal to the rectifier to terminate operation in the rectifying mode. The termination signal may be sent before the mode change signal. The rectifier may idle upon receiving the termination signal. The rectifier may restart in the inverting mode after idling.

According to an embodiment, the termination signal is sent staggered by a predetermined delay after receiving the fault signal. The rectifier may operate in the normal operations mode for as long as the grid is still connected to the inlet of the rectifier. The opening duration of the grid switch is known, so that the rectifier may still go on rectifying, as long as there is an electric contact in the grid switch. The termination signal may be sent synchronized to the alternating current. In particular the termination signal may be sent staggered at the zero crossings of the phases.

According to an embodiment, upon receiving the confirmation signal, the method includes sending a balancing signal to the rectifier and the inverter to balance the load between the rectifier and the inverter. For example, the rectifier and the inverter may each supply half the load. With a balanced load, the rectifier and the inverter may actually cool down from a nominal operating temperature.

According to an embodiment, upon receiving the balancing signal, the rectifier and the inverter operate with a lower load than a nominal load. For example, the rectifier and the inverter may operate at 75% of the nominal load each. By cooperation between the rectifier and the inverter, both components may operate below nominal load and may still supply the load with an overload of 150% nominal load.

According to an embodiment, upon receiving a short circuit signal, which signals a short circuit in the load, the method includes sending a hysteresis signal to the inverter to operate the inverter in a hysteretic mode, wherein until receiving the hysteresis signal, the inverter operates in a linear mode providing a sinusoidal wave output voltage. The shape of the current depends on the load, for example for a non-linear load the current is not sinusoidal. In the hysteretic mode the inverter provides a square wave output current. In a hysteretic mode, the inverter may limit an electric output current, wherein an electric output voltage may be close to zero because of the short circuit. The resulting output voltage may be due to an impedance of the load. In the hysteretic mode a frequency of the square wave current may be equal to a frequency of the sinusoidal wave voltage.

According to an embodiment, upon receiving the short circuit signal and having received the confirmation signal, the method includes sending the hysteresis signal to the rectifier to operate the rectifier in the hysteretic mode, wherein in the hysteretic mode the rectifier converts the DC current from the energy storage into a square wave output current. The rectifier and the inverter may be operated synchronized while providing the square wave output current. In particular, zero crossings of the square wave output current may be synchronized between the rectifier and the inverter.

According to an embodiment, upon receiving the hysteresis signal, the inverter changes into the hysteretic mode, providing a square wave output current with a higher load than a nominal load. For example, the inverter may provide 110% of the nominal load. The output current may be limited to 110% of a nominal output current.

According to an embodiment, until receiving the confirmation signal, the inverter operates in a linear mode, wherein in the linear mode the inverter provides a sinusoidal wave output voltage, wherein upon receiving the mode change signal and the balancing signal the inverter and the rectifier operate in the linear mode and balance the load between the rectifier and the inverter, wherein upon receiving the hysteresis signal the inverter and the rectifier operate in the hysteretic mode, providing a square wave output current, wherein the inverter provides a higher load than a nominal load.

The disclosure further relates to a computer program, which when being executed by a processor, is adapted for performing the method of one of the previous embodiments.

The disclosure further relates to a computer-readable medium, in which a computer program according to an embodiment is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer readable medium may also be a data communication network, e.g. the Internet, which allows downloading a program code. In general, the computer-readable medium may be a non-transitory or transitory medium.

The disclosure further relates to a control device for an uninterruptable power supply, configured to execute the method of one of the previous embodiments.

The disclosure further relates to an uninterruptable power supply device, including a grid connection, a grid switch connected to the grid connection, wherein the grid switch is a mechanical switch, a rectifier and an inverter interconnected via a DC link, an energy storage connected to the DC link, a load connection, to which the inverter is connected, and a bypass switch, which is connected in parallel to the rectifier, DC link and inverter between the grid switch and the load connection, wherein the bypass switch is a semiconductor switch, including a control device according to an embodiment.

According to an embodiment the bypass switch includes two anti-parallel thyristors. A thyristor may be electrically conducting in one direction, while being nonconducting in the opposite direction. Therefore, to conduct the AC current with changing directions of the electric current, two thyristors arranged in opposite directions may be connected in parallel to each other. The thyristors may be switched to a conducting state by the closing signal and stay conductive without upholding the closing signal. Likewise, the thyristors may be switched to a nonconducting state by an opening signal and stay nonconductive without upholding the opening signal.

According to an embodiment the energy storage includes a battery. A battery may be an electrochemical energy storage. While the battery is charged, electric energy is converted to chemical energy stored in the battery. While the battery is discharged, the chemical energy in the battery is converted to electric energy. Other energy storage devices can be used instead of batteries. Energy may be stored in flywheels or fuel cells for example.

These and other aspects of the disclosure will be apparent from and elucidated with reference to the embodiments described hereinafter.

BRIEF DESCRIPTION OF THE DRAWINGS

The subject matter of the disclosure will be explained in more detail in the following text with reference to exemplary embodiments which are illustrated in the attached drawings.

In the drawings, identical parts are provided with the same reference symbols in the figures.

DETAILED DESCRIPTION

Figure 1:
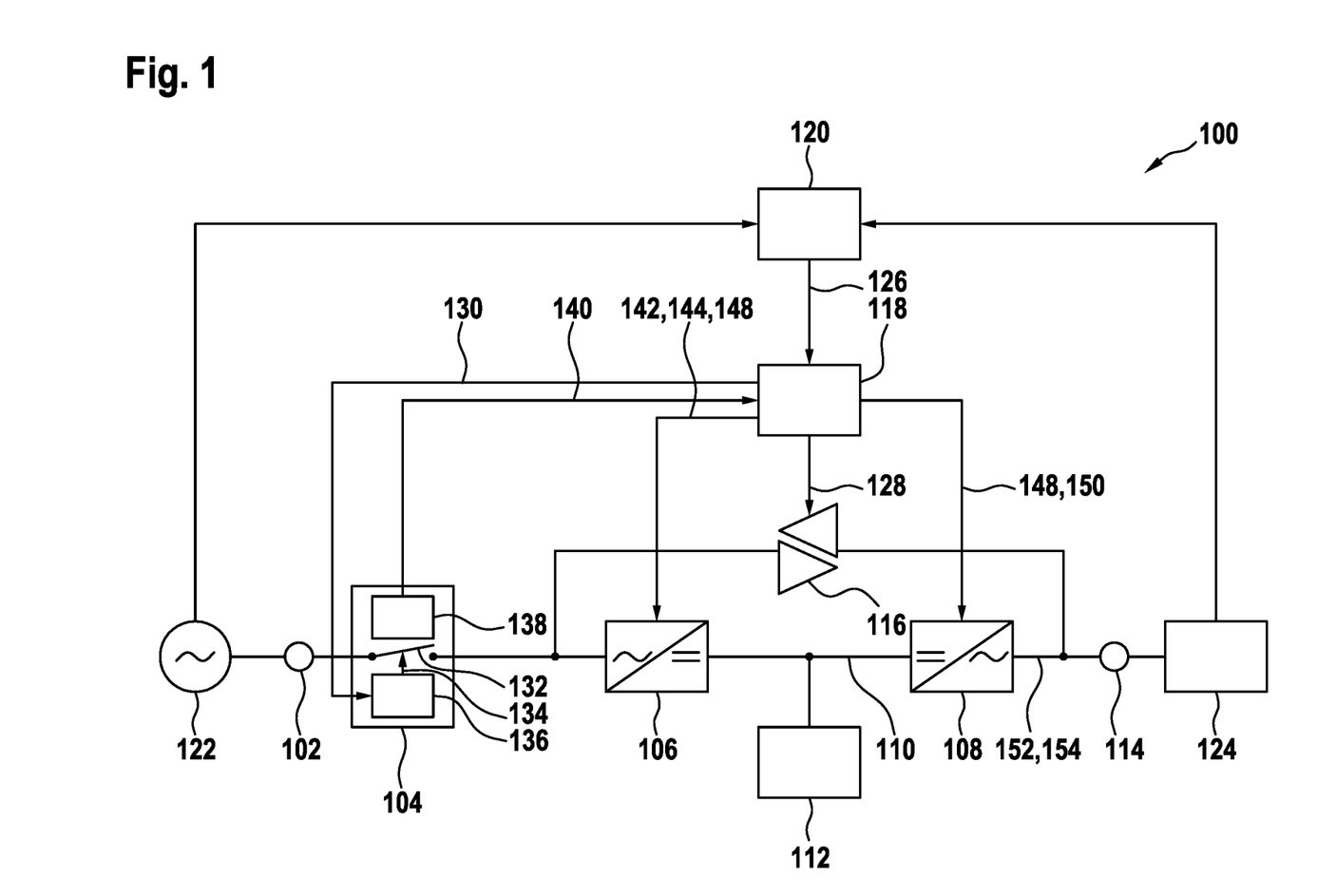
FIG. 1 is a schematic view of an uninterruptable power supply according to an embodiment of the present disclosure.

FIG. 1 schematically shows an uninterruptable power supply 100 according to an embodiment. A grid connection 102 of the uninterruptable power supply 100 is connected to a grid switch 104 of the uninterruptable power supply 100. The grid switch 104 is a mechanical switch. A rectifier 106 of the uninterruptable power supply 100 and an inverter 108 of the uninterruptable power supply 100 are interconnected via a DC link 110. An energy storage 112 of the uninterruptable power supply 100 is connected to the DC link 110. The energy storage 112 may include a battery converter. A load connection 114 of the uninterruptable power supply 100 is connected to the inverter 108. A bypass switch 116 of the uninterruptable power supply 100 is connected in parallel to the rectifier 106, the DC link 110 and the inverter 108 between the grid switch 104 and the load connection 114. The bypass switch 116 is a semiconductor switch. The grid connection 102, the bypass switch 116 and the load connection 114 may have multiple phases. For reasons of clarity, only one phase is shown.

The uninterruptable power supply 100 has a control device 118, that is connected to the grid switch 104, the rectifier 106, the inverter 108, and the bypass switch 116. The control device 118 is further connected to a monitoring device 120, that monitors a grid 122 connected to the grid connection 102 and a load 124 connected to the load connection 114. The monitoring device 120 may also be incorporated in the control device 118.

During normal operation of the uninterruptable power supply 100 the grid switch 104 is closed and the bypass switch 116 is open. During normal operation the rectifier 106 is in a rectifying mode, in which it draws alternating current (AC) from the grid 122 and feeds rectified direct current (DC) to the DC link 110. The rectifier 106 controls the voltage of the DC link 110 to the required voltage by drawing the appropriate currents from the grid. These currents may be sinusoidal and in phase with the respective grid voltage in order to obtain a unity power factor. A bidirectional dc/dc battery converter included in the energy storage 112 transfers power from the DC link 110 to the battery until the battery is fully charged. The rectifier 106 is controlled to keep the voltage of the DC link 110 within a tolerance band. During normal operation the inverter 108 draws direct current (DC) from the DC link 110 and feeds inverted alternating current (AC) to the load 124. The direct current (DC) drawn by the inverter 108 may therefore be supplied by the rectifier 106 and/or the energy storage 112.

If the monitoring device 120 senses an electrical fault in the grid 122 or the load 124, it sends a fault signal 126 to the control device 118. Upon receiving the fault signal 126, the control device 118 sends a disconnect signal 130 to the grid switch 104 to disconnect the uninterruptable power supply 100 from the grid 122. The inverter 108 keeps on drawing direct current (DC) from the DC link 110.

The mechanical grid switch 104 has moving parts 132 that have to be moved by applying a physical force 134. The force 134 upon the moving parts 132 is provided by an opener 136 of the grid switch 104. The opener 136 is activated by the disconnect signal 130. For example, the opener 136 may be a spring and/or an electromagnet. The moving parts 132 take a short duration of time to move to an opened position. Once the moving parts 132 are in the opened position, contacts of the grid switch 104 are far enough apart, so that no electric arc may occur. The uninterruptable power supply 100 is then electrically isolated from the grid 122. A confirmation device 138 of the grid switch 104 sends a confirmation signal 140 to the control device 118 once the moving parts 132 have reached the opened position and the uninterruptable power supply 100 is disconnected from the grid 122. The direct current (DC) of the DC link 110 is now supplied by the energy storage 112.

Upon receiving the confirmation signal 140 that the grid switch 104 is open, the control device 118 sends a closing signal 128 to the bypass switch 116. The bypass switch 116 is switched electronically and virtually instantaneous once the closing signal 128 is received. Once the bypass switch 116 is closed, the rectifier 106 is connected in parallel to the inverter 108 between the energy storage 112 and the load connection 114.

Upon receiving the confirmation signal 140, the control device 118 sends a mode change signal 142 to the rectifier 106. Upon receiving the mode change signal 142 the rectifier 106 operates in an inverting mode and draws direct current (DC) from the DC link 110 and feeds inverted alternating current (AC) to the load 124 via the closed bypass switch 116, so that the load 124 is supplied by both the inverter 108 and the rectifier 106.

In an embodiment, the control device 118 sends a termination signal 144 to the rectifier 106 upon receiving the fault signal 126. Upon receiving the termination signal 144, the rectifier 106 stops drawing alternating current (AC) from the grid 122. Since the grid switch 104 takes some time to open, the termination signal 144 may also be sent time-delayed by a predetermined opening time of the grid switch 104. This way, the rectifier 106 keeps drawing the alternating current (AC) from the grid 122, until the uninterruptable power supply 100 is truly disconnected from the grid 122.

If the fault signal 126 signals an overload in the load connection 114, the control device 118 sends a disconnect signal 130 to the grid switch 104 to disconnect the uninterruptable power supply 100 from the grid 122. Upon receiving the confirmation signal 140 that the grid switch is open, the control device 118 sends a closing signal 128 to the bypass switch 116.

In an embodiment and depending on an amount of overload, the inverter 108 puts out up to 150% nominal load for the time required by the grid switch 104 to open, this can be typically up to 120 milliseconds for a mechanical contactor.

After the rectifier 106 has started inverting the direct current (DC) from the energy storage 112 into alternating current (AC) upon receiving the mode change signal 142, the load 124 is shared between the inverter 108 and the rectifier 106, so that the inverter 108 can reduce its load.

In an embodiment, the control device 118 sends a balancing signal 148 to the inverter 108 and the rectifier 106 upon receiving the confirmation signal 140, to share equal fractions of the load 124. In an embodiment, both the rectifier 106 and the inverter 108 supply up to 75% nominal load after receiving the balancing signal 148. The overload capability may also be 200%, for example. The inverter 108 alone then picks up the full overload of 200% for the time required by the grid switch 104 to open. After that the rectifier 106 and inverter 108 loading is only 100%.

If the fault signal 126 signals a short circuit or a flashover in the load 124, the control device 118 sends a hysteresis signal 150 to the inverter 108 upon receiving the fault signal 126. Upon receiving the hysteresis signal 150, the inverter changes into a hysteretic mode and supplies a square wave current 152 to the load 124. The square wave current 152 differs from a sinusoidal voltage 154 supplied by the inverter 108 when operated in a linear mode. The inverter may put out more than the nominal load when operated in the hysteretic mode. In an embodiment, the inverter 108 supplies 110% nominal RMS current when operated in the hysteretic mode.

Figure 2:
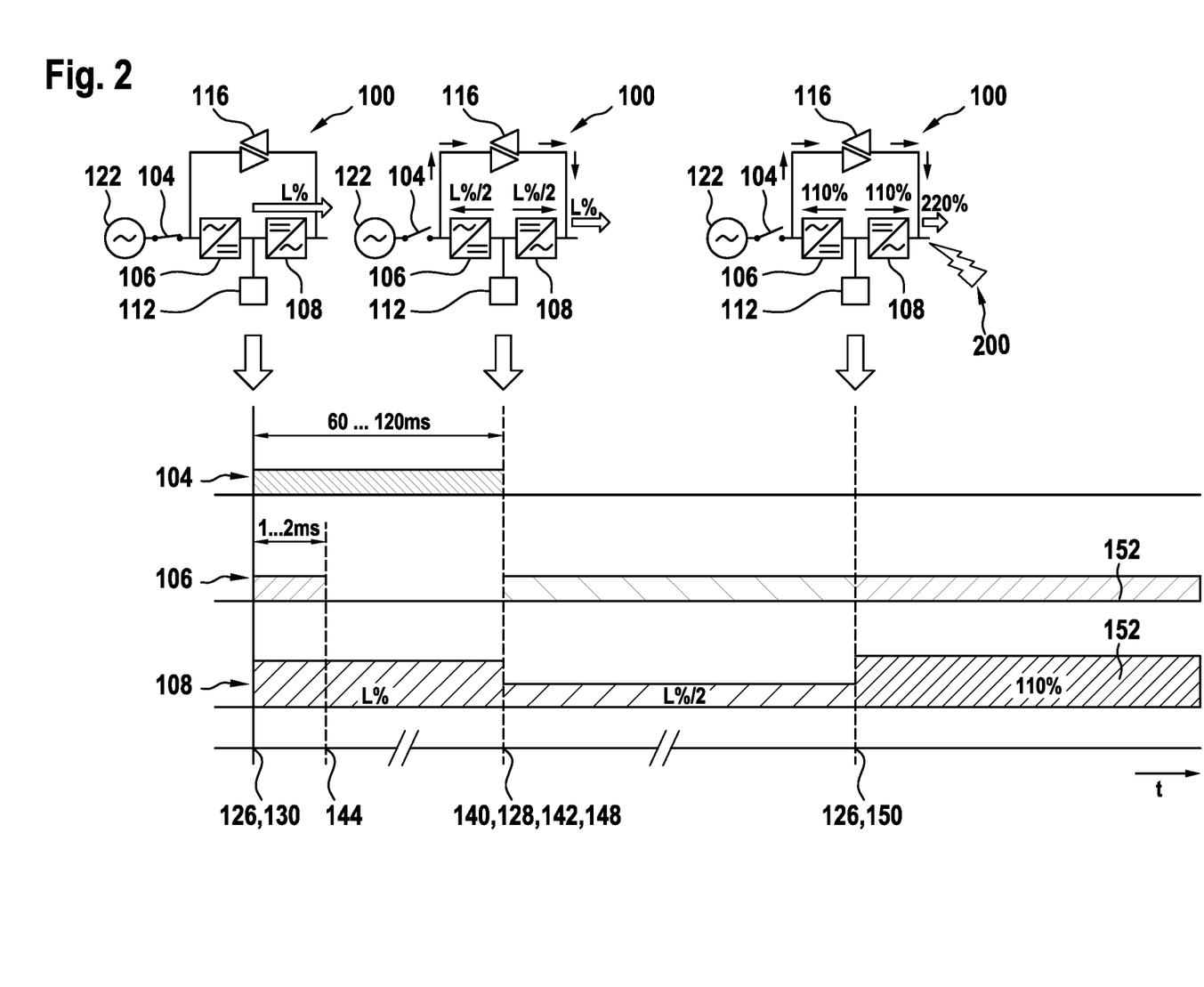
FIGS. 2 and 3 are schematic views of control sequences for an uninterruptable power supply according to an embodiment of the present disclosure.

FIG. 2 schematically shows a control sequence for the uninterruptable power supply 100 of FIG. 1. The control sequence starts with a detection of bypass not available, i.e. grid out of tolerance. Simultaneous the grid switch 104 is commanded to open by sending the disconnect signal 130. The rectifier 106 continues to work in a current control mode and draws sinusoidal currents from the grid. Typically, about one to two milliseconds after receiving the fault signal 126, the termination signal 144 is sent to the rectifier 106 and the rectifier 106 stops operating. About 60 to 120 milliseconds after receiving the disconnect signal 130, the grid switch 104 is open and the confirmation signal 140 is generated. Upon receiving the confirmation signal 140, the closing signal 128 is sent to the bypass switch. Upon receiving the closing signal 128 the rectifier 106 is connected in parallel to the inverter 108 between the energy storage and the load connection. Simultaneous to sending the closing signal 128, the mode change signal 142 is sent to the rectifier 106. Upon receiving the mode change signal 142, the rectifier 106 starts operating in the inverting mode and draws DC current from the energy storage and inverts it into sinusoidal AC current. The so converted AC current flows over the closed bypass switch to the load. Also, simultaneous to sending the mode change signal 142 the balancing signal 148 is sent to the rectifier 106. While the inverter 108 keeps working in voltage control mode to impress the load voltage, the rectifier 106 upon receiving the balancing signal 148 works in current control mode to share the load equally with the inverter.

In an embodiment, sometime after receiving the fault signal 126 signaling the bypass not available, another fault signal 126 signals a short circuit 200 in the load. Upon receiving the fault signal 126, the hysteresis signal 150 is sent to the inverter 108 and the rectifier 106. Upon receiving the hysteresis signal 150, both converters work in the hysteretic current control mode to provide the square wave current 152 to the fault. For example, the inverter 108 puts out 110% nominal load when in the hysteretic current control mode.

In case of an overload the grid switch is commanded to open. As soon as it opens, the bypass is closed and the rectifier is used to share the load with the inverter.

The short-circuit is more complex and different strategies can be used. In a first strategy, if the grid is available, the grid is used to provide the fault current by activating the bypass. If the grid is not available, then the grid switch can be opened in advance, for example as soon as the grid is detected to be out of tolerance. Therefore, whenever a short-circuit happens without the grid the UPS is already ready to use both the inverter and the rectifier to deliver fault current to the load. As soon as the grid switch is open, the rectifier and the inverter share the load applied. Each converter takes half the load (L/2). In this situation, if a short-circuit happens, both converters will switch to hysteretic current control mode to deliver the desired amount of fault current (e.g. 110% each to reach 220% total). When the short-circuit happens before the grid switch is open, the inverter alone provides the fault current until the grid switch is open. At that point the rectifier is used to increase the amount of fault current.

Figure 3:
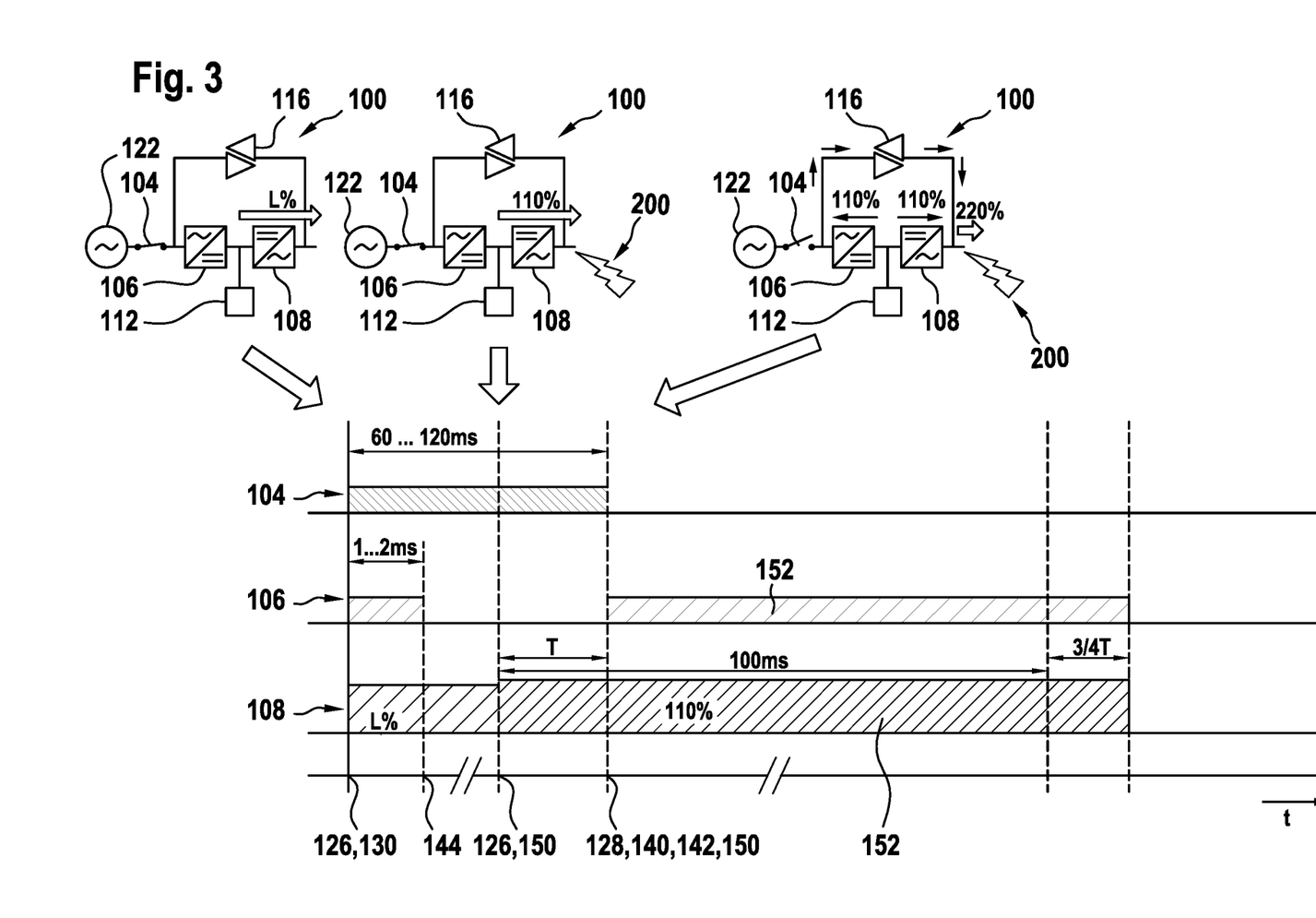

FIG. 3 schematically shows another control sequence for the uninterruptable power supply 100 of FIG. 1. As in FIG. 2 the control sequence starts with a detection of "bypass not available". The fault signal 126 signaling the "bypass not available" is generated. Simultaneous to sending the "bypass not available" signal 126 the grid switch 104 is commanded to open by sending the disconnect signal 130. The rectifier 106 continues to work in a current control mode and draws sinusoidal currents from the grid. About one to two milliseconds after receiving the fault signal 126, the termination signal 144 is sent to the rectifier 106 and the rectifier 106 stops operating.

While the grid switch 104 is still in the process of opening, another fault signal 126 signals the short circuit 200 in the load. Upon receiving the other fault signal 126, the hysteresis signal 150 is sent to the inverter 108 alone. Upon receiving the hysteresis signal 150, the inverter works in the hysteretic current control mode to provide the square wave current 152 to the fault. For example, the inverter 108 puts out 110% nominal load when in the hysteretic current control mode.

About 60 to 120 milliseconds after receiving the disconnect signal 130, the grid switch 104 has finished opening and the confirmation signal 140 is generated. Upon receiving the confirmation signal 140, the closing signal 128 is sent to the bypass switch. Upon receiving the closing signal 128 the rectifier 106 is connected in parallel to the inverter 108 between the energy storage and the load connection. Simultaneous to sending the closing signal 128, the mode change signal 142 and another hysteresis signal 150 are sent to the rectifier 106. Upon receiving the mode change signal 142 and the hysteresis signal 150, the rectifier 106 works in the hysteretic current control mode to also provide the square wave current 152 to the fault.

In the following passages, the presented idea is described in different words. The idea is to the increase power capability in an uninterruptable power supply (UPS).

UPS converters are usually designed to provide specific overload and fault capabilities, typically 150% overload for 30 sec. and 220% short-circuit for 100 ms. These constraints heavily condition the UPS inverter semiconductor caliber, thermal design and cost. This is because the inverter alone has to provide the full specified power in overload and fault conditions.

In overload operation, the inverter typically supports 150% for 30 s when the bypass switch is open. The inverter is operating in a linear regime and controls the voltage on the critical load. The bypass supports higher overloads, typically 150% for 60 s.

In current UPS designs various overload strategies are utilized, depending also on the amount of overload. For example, in a first strategy when an overload of say 125% is detected, the load can be left on inverter until the inverter capability is exhausted (e.g. 60 s). Then the load will be transferred to the bypass. In a second strategy, when an overload of say 120% is detected, the load can be transferred to the bypass until the bypass overload capability is exhausted. Then the load will be transferred back to the inverter. Clearly, if the bypass is not available the overload has to be supplied by the inverter alone.

In short circuit operation, the inverter typically delivers 220% short-circuit current for 100 ms when the bypass switch is open. The bypass delivers more than 220% short-circuit current for more than 100 ms, typically 1000% for ½ cycle.

In short-circuit conditions the inverter is typically controlled in a hysteretic current control mode to provide a square wave current to the fault. The voltage being very close to zero, depending on the impedance of the short-circuit. When a short-circuit is detected at the UPS output, the normal sinusoidal voltage collapses to zero with the short-circuit. Then the inverter bridge current is controlled to provide a square wave current at the output after the LC filter.

The idea here is to provide the fault current from the bypass when the grid is available and from both rectifier and inverter when the grid is not available. Similarly, the stress in overload operation can be reduced by using the rectifier to support the inverter.

The presented idea contributes to the economic viability of UPS with SiC devices, makes possible a substantial increase of the fault current capability in traditional UPS, e.g. from 220% to 440% or may reduce cost of UPS for same performance.

In overload operation with the new design, the inverter typically supports 150% for 5 s when the bypass switch is open. The inverter is operated in a linear regime and controls the voltage on the critical load. The bypass supports higher overloads than the inverter, typically 150% for 60 s.

In the new UPS design various overload strategies can be used, depending typically on the amount of overload. From an overload capability point of view the design of the bypass can be done as in a traditional design. The main difference is the overload on inverter. To improve overload operation in the new design a contactor is added at the UPS input.

The overload on the inverter is started by commanding the input switch to open and the rectifier to switch off. During this time, the inverter alone is carrying the overload (e.g. 150%). Once the input switch is open (typically after 60 to 120 ms for a contactor, depending on the size), the bypass is switched on and the rectifier is used in reverse mode to share the load with the inverter. From this point on, both the inverter and the rectifier are sharing the overload (e.g. 75% each).

If the bypass is available than it can deliver more than 220% short-circuit current for more than 100 ms (typically 1000% for ½ cycle). Typically and even in the case of a common grid connected to the bypass and rectifier inputs, the conditions "bypass available" and "rectifier mains available" are different and depend on different conditions related to the grid amplitude and phase with respect to other internal variables. Also and typically, the conditions to state "rectifier mains available" are tougher than the ones to determine "bypass available".

To improve short-circuit operation in the new design a switch is added at the UPS input. The switch (e.g. a contactor) typically is controlled by a command signal, to command it to open or to close, an auxiliary contact, to actually measure if the contact is open or closed, and supply voltage terminals to feed the contactor coil.

If the bypass is not available then the input switch is opened, the rectifier is switched off, the inverter will continue to control the voltage of the critical load, taking the energy from the battery. In case of a short-circuit, the bypass switch is closed and the short-circuit current is provided by both the inverter and the rectifier operating in reverse mode. Typically, both the inverter and the rectifier will deliver 110% short-circuit current for 100 ms.

A variant of the above strategy is to share the load between inverter and rectifier right after the input contactor is detected open by reading the auxiliary contact of the contactor. This has the advantage that the inverter and rectifier are already working in a cooperative mode before the occurrence of a potential short-circuit. Various control techniques can be used for the cooperative operation of the inverter and the rectifier in reverse mode.

If the short-circuit happens before the input contactor is open, the inverter alone will be operated in hysteretic current control mode. Once the contactor is open, the rectifier will also be operated in hysteretic current control mode to assist the inverter. If this happens and to compensate the loss of short-circuit current, the operation in short-circuit can be extended from typically 100 ms to (100 ms+3T/4) where T is the time in [ms] where only the inverter is feeding the short circuit. This way the same I2t can be kept.

The probability that the short-circuit happens before the input contactor is open is extremely low and, in this case, the above strategy is applied. To further reduce this probability or even completely avoid this case a faster disconnector switch can be used in place of the mechanical contactor. For example, using IGBTs or IGCTs the opening time is virtually zero while using SCRs (thyristors) the opening time can be in the order of 2 to 3 ms using a reverse bias technique to force the switching off.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those skilled in the art and practicing the claimed disclosure, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

What is claimed is:

1. A method for controlling an uninterruptable power supply, wherein the uninterruptable power supply comprises a grid connection, a grid switch connected to the grid connection, a rectifier and an inverter interconnected via a DC link, an energy storage connected to the DC link, a load connection, to which the inverter is connected, and a bypass switch, which is connected in parallel to the rectifier, the DC link and the inverter between the grid switch and the load connection;

wherein the grid switch is a mechanical switch and the bypass switch is a semiconductor switch;

wherein the grid switch comprises a confirmation device configured to generate a confirmation signal in response to the uninterruptible power supply being disconnected from the grid connection;

the method comprising:
  in a normal operation mode in which the bypass switch is opened, the grid switch is closed, the uninterruptable power supply is connected to a grid via the grid connection and connected to a load via the load connection, operating the rectifier in a rectifying mode, in which an AC current from the grid is converted to a DC current supplied to the DC link and operating the inverter to convert the DC current from the DC link into an AC current supplied to the load;
  upon receiving a fault signal, which signals an electrical fault concerning at least one of the load and the grid, sending a disconnect signal to the grid switch to open the grid switch and disconnect the uninterruptable power supply from the grid; and
  upon receiving the confirmation signal from the grid switch, which confirms disconnection from the grid, sending a closing signal to the bypass switch and sending a mode change signal to the rectifier to operate the rectifier in an inverting mode, in which a DC current from the energy storage is converted into an AC current, such that the load is supplied by the inverter and the rectifier.

2. The method according to claim 1, further comprising:
  upon receiving the fault signal, sending a termination signal to the rectifier to terminate operation in the rectifying mode.

3. The method according to claim 2, wherein the termination signal is sent staggered by a predetermined delay after receiving the fault signal.

4. The method according to claim 1, further comprising:
  upon receiving the confirmation signal, sending a balancing signal to the rectifier and the inverter to balance the load between the rectifier and the inverter.

5. The method according to claim 4, wherein upon receiving the balancing signal, the rectifier and the inverter operate with a lower load than a nominal load.

6. The method according to claim 1, further comprising:
  when the fault signal signals a short circuit in the load, sending a hysteresis signal to the inverter to operate the inverter in a hysteretic mode, wherein until receiving the hysteresis signal, the inverter operates in a linear mode providing a sinusoidal wave output voltage, wherein in the hysteretic mode the inverter provides a square wave output current.

7. The method according to claim 6, further comprising:
  upon receiving the fault signal signaling the short circuit and having received the confirmation signal, sending the hysteresis signal to the rectifier to operate the rectifier in the hysteretic mode, wherein in the hysteretic mode the rectifier converts the DC current from the energy storage into a square wave output current.

8. The method according to claim 6, wherein upon receiving the hysteresis signal, the inverter changes into the hysteretic mode, providing a square wave output current with a higher load than a nominal load.

9. The method according to claim 4,
  wherein until receiving the confirmation signal the inverter operates in a linear mode, wherein in the linear mode the inverter provides a sinusoidal wave output voltage, wherein upon receiving the mode change signal and the balancing signal the inverter and the rectifier operate in the linear mode and balance the load between the rectifier and the inverter, wherein upon receiving the hysteresis signal the inverter and the rectifier operate in the hysteretic mode, providing a square wave output current, and wherein the inverter provides a higher load than a nominal load.

10. A control device for an uninterruptable power supply,
  wherein the uninterruptable power supply comprises a grid connection, a grid switch connected to the grid connection, a rectifier and an inverter interconnected via a DC link, an energy storage connected to the DC link, a load connection, to which the inverter is connected, and a bypass switch, which is connected in parallel to the rectifier, the DC link and the inverter between the grid switch and the load connection;
  wherein the grid switch is a mechanical switch and the bypass switch is a semiconductor switch;
  wherein the grid switch comprises a confirmation device configured to generate a confirmation signal in response to the uninterruptible power supply being disconnected from the grid connection;
  the control device configured to:
    in a normal operation mode in which the bypass switch is opened, the grid switch is closed, the uninterruptable power supply is connected to a grid via the grid connection and connected to a load via the load connection, operate the rectifier in a rectifying mode, in which an AC current from the grid is converted to a DC current supplied to the DC link and operating the inverter to convert the DC current from the DC link into an AC current supplied to the load;
    upon receiving a fault signal, which signals an electrical fault concerning at least one of the load and the grid, send a disconnect signal to the grid switch to open the grid switch and disconnect the uninterruptable power supply from the grid; and
    upon receiving the confirmation signal from the grid switch, which confirms disconnection from the grid, send a closing signal to the bypass switch and sending a mode change signal to the rectifier to operate the rectifier in an inverting mode, in which a DC current from the energy storage is converted into an AC current, such that the load is supplied by the inverter and the rectifier.

11. An uninterruptable power supply device comprising:
  a grid connection;
  a grid switch connected to the grid connection, wherein the grid switch is a mechanical switch, and wherein the grid switch comprises a confirmation device configured to generate a confirmation signal in response to the uninterruptible power supply being disconnected from the grid connection;
  a rectifier and an inverter interconnected via a DC link;
  an energy storage connected to the DC link;
  a load connection, to which the inverter is connected;

a monitoring device configured to generate a fault signal in response to detecting an electrical fault at a grid or at a load;

a bypass switch, which is connected in parallel to the rectifier, the DC link and the inverter between the grid switch and the load connection, wherein the bypass switch is a semiconductor switch; and a control device configured to:

in a normal operation mode in which the bypass switch is opened, the grid switch is closed, the uninterruptable power supply device is connected to the grid via the grid connection and connected to the load via the load connection, operate the rectifier in a rectifying mode, in which an AC current from the grid is converted to a DC current supplied to the DC link and operating the inverter to convert the DC current from the DC link into an AC current supplied to the load;

upon receiving the fault signal from the monitoring device, which signals an electrical fault concerning at least one of the load and the grid, send a disconnect signal to the grid switch to open the grid switch and disconnect the uninterruptable power supply device from the grid; and upon receiving the confirmation signal from the grid switch, which confirms disconnection from the grid, send a closing signal to the bypass switch and sending a mode change signal to the rectifier to operate the rectifier in an inverting mode, in which a DC current from the energy storage is converted into an AC current, such that the load is supplied by the inverter and the rectifier.

12. The uninterruptable power supply device according to claim 11, wherein the bypass switch comprises two anti-parallel thyristors.

13. The uninterruptable power supply device according to claim 11, wherein the energy storage comprises a battery.

* * * * *